United States Patent
Lin et al.

(10) Patent No.: US 12,205,059 B1
(45) Date of Patent: Jan. 21, 2025

(54) VENDOR RISK ASSESSMENT USING INTERNET TELEMETRY

(71) Applicant: Rapid7, Inc., Boston, MA (US)

(72) Inventors: Wah-Kwan Lin, Melrose, MA (US); Harley Ray Rogers, Somerville, MA (US)

( * ) Notice: Subject to any disclaimer, the term of this patent is extended or adjusted under 35 U.S.C. 154(b) by 584 days.

(21) Appl. No.: 17/360,277

(22) Filed: Jun. 28, 2021

(51) Int. Cl.
*G06Q 10/0635* (2023.01)
*H04L 9/40* (2022.01)

(52) U.S. Cl.
CPC ..... *G06Q 10/0635* (2013.01); *H04L 63/1425* (2013.01); *H04L 63/1433* (2013.01); *H04L 63/20* (2013.01)

(58) Field of Classification Search
CPC ............. H04L 63/1433; H04L 63/1416; H04L 63/1425; H04L 63/1491; G06F 21/577; G06F 16/955; G06Q 10/0635
See application file for complete search history.

(56) References Cited

U.S. PATENT DOCUMENTS

| | | | |
|---|---|---|---|
| 9,942,250 B2 * | 4/2018 | Stiansen | H04L 63/1416 |
| 11,165,797 B2 * | 11/2021 | Ackerman | H04L 63/1458 |
| 11,509,667 B2 * | 11/2022 | Hines | G06N 3/08 |
| 2021/0248624 A1 * | 8/2021 | Keren | G06Q 50/184 |

FOREIGN PATENT DOCUMENTS

CA 3059788 A1 * 11/2018 ......... H04L 41/0213

OTHER PUBLICATIONS

T. Yagi, N. Tanimoto, T. Hariu and M. Itoh, "Investigation and analysis of malware on websites," 2010 12th IEEE International Symposium on Web Systems Evolution (WSE), Timisoara, Romania, 2010, pp. 73-81 Https://ieeexplore.ieee.org/document/5623567?source=IQplus (Year: 2010).*

* cited by examiner

*Primary Examiner* — Jerry O'Connor
*Assistant Examiner* — Michael R Koester
(74) *Attorney, Agent, or Firm* — Ashwin Anand

(57) ABSTRACT

Various embodiments include systems and methods of assessing vendor risk. One or more sets of IP address(es) associated with one or more vendors is identified. Risk data related to the set(s) of IP address(es) is obtained using internet telemetry data. Based at least in part on the risk data, security risk level(s) are determined for the vendor(s). Some embodiments include systems and methods of implementing a vendor-based risk posture assessment of an organization. The vendor-based risk posture assessment may be based at least in part on one or more security risk levels determined for the vendor(s) of the organization.

20 Claims, 8 Drawing Sheets

700

```
┌─────────────────────────────────────────────────────────────┐
│ Determine, based on a combination of first and second vendor risk │
│         data, a security risk level of a vendor              │
│                          710                                 │
└─────────────────────────────────────────────────────────────┘
                              │
                              ▼
┌─────────────────────────────────────────────────────────────┐
│  Generate an alert associated with the security risk level of the vendor │
│                          720                                 │
└─────────────────────────────────────────────────────────────┘
                              │
                              ▼
┌─────────────────────────────────────────────────────────────┐
│ Determine one or more remedial actions to mitigate one or more │
│         security risks associated with the vendor            │
│                          730                                 │
└─────────────────────────────────────────────────────────────┘
```

*FIG. 7*

VENDOR RISK ASSESSMENT USING INTERNET TELEMETRY

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Organizations routinely enter into business arrangements with outside vendors to handle various services. To effectively engage in these arrangements often involves imbuing the contracted vendors with some degree of trust and privileged access to sensitive systems. Vendors have served as a channel through which major data breaches have been executed. This introduces some element of risk, which has typically been addressed through credentialing, contract terms, and survey assessments. While such approaches do provide a wealth of information for the purpose of vendor risk assessment, better approaches are needed to assess vendor risk.

SUMMARY OF EMBODIMENTS

The systems and methods described herein relate to vendor risk assessment. The application of using internet telemetry as a means to assess vendor risk as described in the present disclosure represents a fundamentally different approach from the conventional approach of relying on independent certifications, compliance standards, and a vendor's own disclosures. In the present disclosure, information that is collected through internet telemetry serves as a reflection of the overall security posture of a particular vendor that is verifiable, independent, and objective. One aspect of the present disclosure may involve utilizing the assessment of the overall riskiness of a particular vendor to inform decisions regarding how to engage or not engage with that vendor. Another aspect of the present disclosure may include extending the approaches described herein to assess an organization's risk posture based on secondary exposure to risk through multiple vendors.

BRIEF DESCRIPTION OF THE DRAWINGS

FIG. 7 is a flowchart that illustrates an example process of generating an alert and/or determining one or more remedial actions in response to determining a security risk level of a vendor, according to some embodiments.

Figure 1:
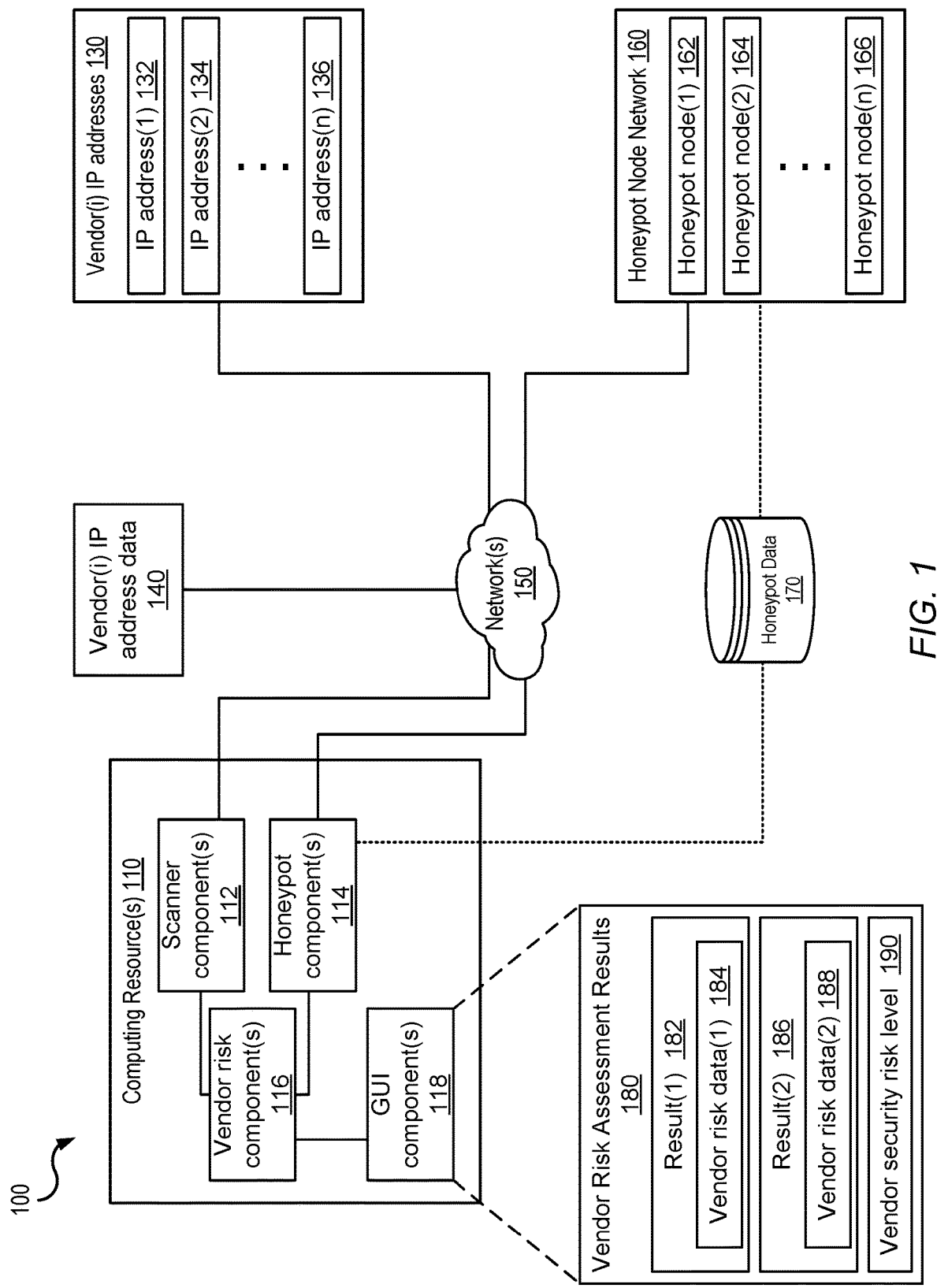
FIG. 1 is a block diagram illustrating an example system that performs a vendor risk assessment, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of assessing vendor risk through internet telemetry and fingerprinting. While conventional approaches to vendor risk assessment may provide a wealth of information for the purpose of vendor risk assessment, even more information can be gleaned of vendors through the collection of internet telemetry, which can reflect quite dramatically on the security posture of vendors. Using a combination of internet scans targeted at specific vendors coupled with a fingerprinting mechanism when appropriate, the system of the present disclosure provides the ability to make precise and technical determinations about the overall publicly-facing information technology (IT) posture of a vendor. This in turn can inform decisions on whether or not to engage with a vendor, or perhaps to either alter a relationship with a vendor or even terminate a relationship with a vendor based on security concerns.

By using an outbound internet scanner targeted at a vendor, the system of the present disclosure provides the ability to collect a broad range of details on public exposure which can inform a security assessment of a vendor. Organizations with large IT footprints may expose details on the public internet. Some of these exposures can be considered relatively benign (e.g., HTTP, HTTPS, SSH, etc.), but some exposures can be regarded as indicators of high risk.

A vendor can be considered to be of higher risk if various details are publicly exposed, which might reflect organizational practices that lead to scenarios of poor security. Various examples of a non-exhaustive set of such higher risk details are described herein. One example is expired certificates, which can be extracted from public domain name service (DNS) records. Another example is exposed server message block (SMB), which has been used for significant exploits. Another example is exposed remote desktop protocol (RDP), which does serve a functional purpose for an organization, but nonetheless elevates the riskiness of the organization. Another example is exposed infrastructure application protocols, which should not be exposed publicly. Non-limiting examples of such infrastructure application protocols include: network time protocol (NTP); android debug bridge (ADB); and border gateway protocol (BGP). Another example of a higher risk detail is exposed instances of unencrypted services, such as file transfer protocol (FTP) and telnet. Another example is utilization of operating systems, applications, or services that have officially reached their end-of-life and are no longer supported or patched by the original producers.

In general, the more risky elements that are exposed, the riskier a vendor may be considered. This knowledge represents one part of the consideration of whether or not to engage with a vendor and to entrust the vendor with privileged access at all.

In some embodiments, the system of the present disclosure may also complement an assessment of a vendor's riskiness by examining honeypot data for traffic originating from the vendor. If connections to the honeypot(s) are discovered originating from a given vendor, it may be assumed that some part of the vendor is compromised. Such honeypot connection(s) may be associated with a botnet, or there may be some sort of system misconfiguration, which reflects poorly on the reliability of an organization's IT infrastructure. Honeypot connection(s) originating from a vendor may be considered especially concerning.

The application of using internet telemetry as a means to assess vendor risk as described in the present disclosure represents a fundamentally different approach from the conventional approach of relying on independent certifications, compliance standards, and a vendor's own disclosures. With the system of the present disclosure, the information collected through internet telemetry serves as a reflection of the overall security posture of a vendor that is verifiable, independent, and objective.

The methods described herein may utilize various organization-specific assessments of attack surface, each with the intent of functioning as a mechanism to collect information that informs risk assessments of outside vendors. The approach(es) described in the present disclosure may also be extended to reflect on an organization's risk posture based on secondary exposure to risk through vendors, which is in effect an application of a centrality measure derived from graph theory. To illustrate, if all of an organization's vendors are considered relatively high risk, then the organization is by extension considered relatively high risk. By contrast, if the same organization uses only relatively low risk vendors, then that organization is by extension considered relatively low risk.

One aspect of the present disclosure involves collecting details that may be used to identify specific internet protocol (IP) addresses of a vendor. This may be achieved through open source searching of domain details through DNS records or by examining internet registrar records. Alternatively, specific IP addresses may be identified via a request sent to the vendor.

One aspect of the present disclosure involves performing a broad scan of the addressable internet space of a vendor to find details of exposure of different services, applications, and protocols. When possible, such scan results may be "fingerprinted" to arrive at a higher resolution on the details of exposure. To illustrate, such fingerprinting may involve identifying specific application versions, which in turn can reflect such details as vulnerability to particular exploits that may have been addressed by subsequent patches.

One aspect of the present disclosure may involve maintaining an active honeypot cloud network to monitor for inbound connections. Maintaining such an active honeypot network may allow for an examination of honeypot data for traffic originating from a vendor. As previously described herein, such honeypot data may complement an assessment of a vendor's riskiness as discovery of honeypot connection(s) originating from the vendor is indicative of some part of the vendor being compromised.

One aspect of the present disclosure may involve collecting and analyzing exposure data and honeypot data for specific vendor IP addresses to arrive at an assessment of the overall riskiness of a vendor.

One aspect of the present disclosure may involve utilizing the assessment of the overall riskiness of a vendor to inform decisions regarding how to engage or not engage with that vendor.

One aspect of the present disclosure may involve repeating the same vendor assessment for one or more vendors at various time intervals. Repeating the assessment(s) for one or more vendors may provide the ability to determine if there have been any security lapses or areas for security improvement.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that performs a vendor risk assessment, in accordance with some embodiments. As described further herein, the example system 100 depicted in FIG. 1 may provide the ability to assess an overall publicly-facing IT posture of one or more vendors associated with an organization. As previously described herein, conventional approaches to assessing vendor risk rely on independent certifications, compliance standards, and a vendor's own disclosures. By contrast, the system 100 of FIG. 1 provides the ability to collect information about an overall security posture of the vendor(s) that is verifiable, independent, and objective. The overall security posture may inform risk assessments of outside vendors by an organization.

While FIG. 1 depicts an example of vendor risk assessment for a single vendor, the approaches described herein may also be extended to reflect on an organization's risk posture based on secondary exposure to risk through multiple vendors, which is in effect an application of a centrality measure derived from graph theory. To illustrate, if all of an organization's vendors are considered relatively high risk, then the organization is by extension considered relatively high risk. By contrast, if the same organization uses only relatively low risk vendors, then that organization is by extension considered relatively low risk. An example approach to assessing a risk posture of an organization is illustrated and described further herein with respect to FIG. 6.

Figure 8:
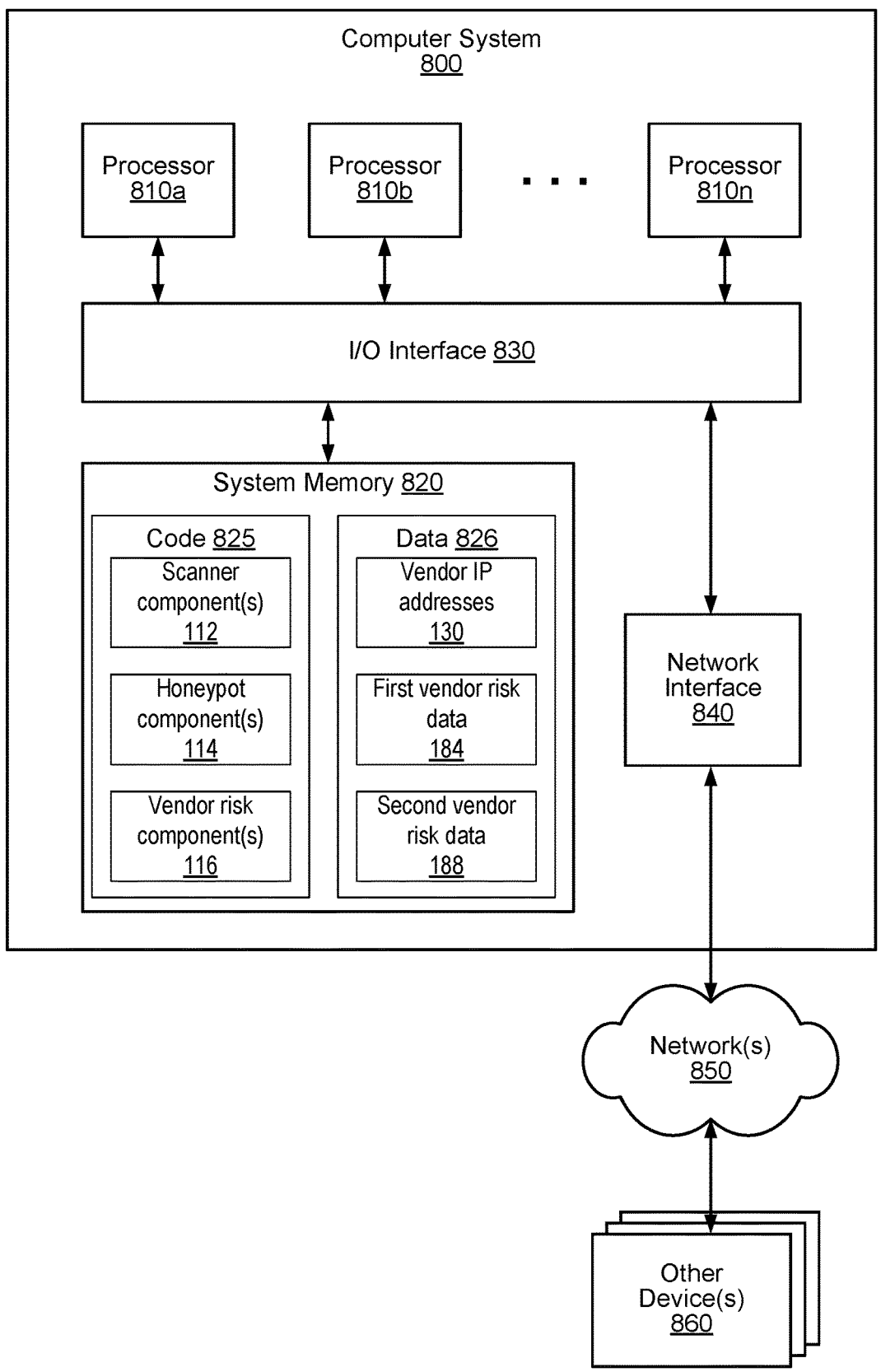
FIG. 8 is a block diagram illustrating an example computer system that may be used to implement one or more portions of a system that performs a vendor risk assessment, according to some embodiments.

FIG. 1 depicts one or more computing resources 110, which may include one or more hardware processors with associated memory (not shown, see e.g. FIG. 8). The computing resource(s) 110 may be configured to implement one or more scanner components 112, one or more honeypot components 114, and one or more vendor risk components 116. FIG. 1 further illustrates that the computing resource(s) 110 may be configured to implement one or more graphical user interface (GUI) components 118.

FIG. 1 illustrates that, for a particular vendor (identified as "Vendor (i)" in FIG. 1), a set of one or more IP addresses 130 may be identified as being associated with the particular vendor. In the illustrative embodiment depicted in FIG. 1, the set of IP addresses 130 associated with one vendor (Vendor (i)) includes a first IP address 132 and a second IP address 134, up to an nth IP address 136. In some cases, the identification of IP addresses for a particular vendor may be achieved through open source searching of domain details through DNS records or by examining internet registrar records. Alternatively, specific IP addresses may be identified via a request sent to the particular vendor. In FIG. 1, the source of the IP address information is identified as Vendor (i) IP address data 140, which may be obtained at least in part via one or more networks 150 (in some cases).

The scanner component(s) 112 may be configured to obtain internet telemetry data for each IP address associated with a particular vendor. The scanner component(s) 112 may be configured to utilize the internet telemetry data to determine a scan result based at least in part on one or more security exposures associated with a particular IP address. As illustrated and further described herein with respect to FIG. 2, the scanner component(s) 112 may perform outbound internet scans for each of the individual IP addresses 132-136 associated with the vendor to obtain individual scan results.

By using the scanner component(s) 112 as an outbound internet scanner targeted at a particular vendor, the system of the present disclosure provides the ability to collect a broad range of details on public exposure which can inform a security assessment of the particular vendor. Vendors with large IT footprints may expose details on the public internet. Some of these exposures can be considered relatively benign (e.g., HTTP, HTTPS, SSH, etc.), but some exposures can be regarded as indicators of high risk, as described further herein with respect to FIG. 2. It should be noted that all data collected by the scanner component(s) 112 is inherently public and is not collected through any credentialed or invasive measures.

FIG. 1 further illustrates that a honeypot node network 160 may be utilized to monitor for inbound connections (e.g., via the one or more networks 150). In the simplified example depicted in FIG. 1, the honeypot node network 160 is shown to include a first honeypot node 162 and a second honeypot node 164, up to an nth honeypot node 166. Maintaining such an active honeypot network may allow for an examination of honeypot data 170 for traffic originating from a particular vendor. The honeypot component(s) 114 may be configured to determine whether one or more honeypot connections originate from any of the identified IP address(es) associated with a particular vendor based on the honeypot data 170 collected using the honeypot node network 160. As illustrated and further described herein with respect to FIG. 3, the honeypot component(s) 114 may compare each of the individual IP addresses 132-136 associated with the vendor to IP addresses stored as the honeypot data 170 to obtain individual honeypot connection results.

The vendor risk component(s) 116 may be configured to aggregate the individual scan results for each IP address associated with the vendor to determine first vendor risk data 184 corresponding to a first vendor risk assessment result 182. For example, as illustrated and further described herein with respect to FIG. 2, the scanner component(s) 112 may provide the individual scan results associated with each of the IP addresses to the vendor risk component(s) 116 for aggregation purposes.

The vendor risk component(s) 116 may be configured to aggregate the individual honeypot connection results for each IP address associated with the vendor to determine second vendor risk data 188 corresponding to a second vendor risk assessment result 186. For example, as illustrated and further described herein with respect to FIG. 3, the honeypot component(s) 114 may provide the individual honeypot connection results associated with each of the IP addresses to the vendor risk component(s) 116 for aggregation purposes.

The vendor risk component(s) 116 may be configured to determine, based on a combination of the first vendor risk data 184 and the second vendor risk data 188, a security risk level 190 of the vendor. The security risk level 190 may represent an assessment of the overall riskiness of a vendor that is verifiable, independent, and objective. As described further herein, an organization may utilize such an assessment of the overall riskiness of a particular vendor to inform decisions regarding how to engage or not engage with the particular vendor.

The security risk level 190 associated with a particular vendor may be considered to be relatively high risk if various details are publicly exposed, which might reflect organizational practices that lead to scenarios of poor security. Various examples of a non-exhaustive set of such higher risk details are described herein. In general, the more risky elements that are exposed, the riskier a particular vendor may be considered. This knowledge represents one part of the consideration of whether or not to engage with a vendor and to entrust the vendor with privileged access at all.

The security risk level 190 associated with a particular vendor may be considered to be relatively high risk if the honeypot data 170 indicates that honeypot connection(s) are discovered as originating from the particular vendor. If such honeypot connection(s) are discovered as originating from the particular vendor, it may be assumed that some part of the particular vendor is compromised. Such honeypot connection(s) may be associated with a botnet, or there may be some sort of system misconfiguration, which reflects poorly on the reliability of that vendor's IT infrastructure. Such honeypot connection(s) may be considered especially concerning. This knowledge may complement the assessment of a vendor's riskiness based on relatively high risk details that are publicly exposed.

While FIG. 1 depicts an example of a single assessment of vendor risk, the approaches described herein may also be extended by repeating the same vendor assessment for one or more vendors at various time intervals. Repeating the assessment(s) for one or more vendors may provide the ability to determine if there have been any security lapses or areas for security improvement. An example approach to repeating the security assessment(s) for one or more vendors at various time intervals is illustrated and described further herein with respect to FIG. 5.

The GUI component(s) 118 may be configured to display vendor risk assessment results 180. In the example depicted in FIG. 1, a first vendor risk assessment result 182 may include at least a portion of the first vendor risk data 184, which may be determined by aggregating the individual scan results for each IP address associated with the vendor. In the example depicted in FIG. 1, a second vendor risk assessment result 186 may include at least a portion of the second vendor risk data 188, which may be determined by aggregating the individual honeypot connection results for each IP address associated with the vendor. FIG. 1 further illustrates that the vendor risk assessment results 180 may include the security risk level 190 associated with the vendor.

Thus, FIG. 1 illustrates an example of a system 100 that performs a vendor risk assessment. The example system 100 depicted in FIG. 1 may provide the ability to assess the overall publicly-facing IT posture of one or more vendors associated with an organization. In contrast to conventional approaches to assessing vendor risk, the system 100 of FIG. 1 provides the ability to collect information about an overall security posture of the vendor(s) that is verifiable, independent, and objective. An organization may utilize this information when making decisions related to engagement with a particular vendor, alteration of a relationship with a particular vendor, or even termination of a relationship with a particular vendor based on security concerns.

Figure 2:
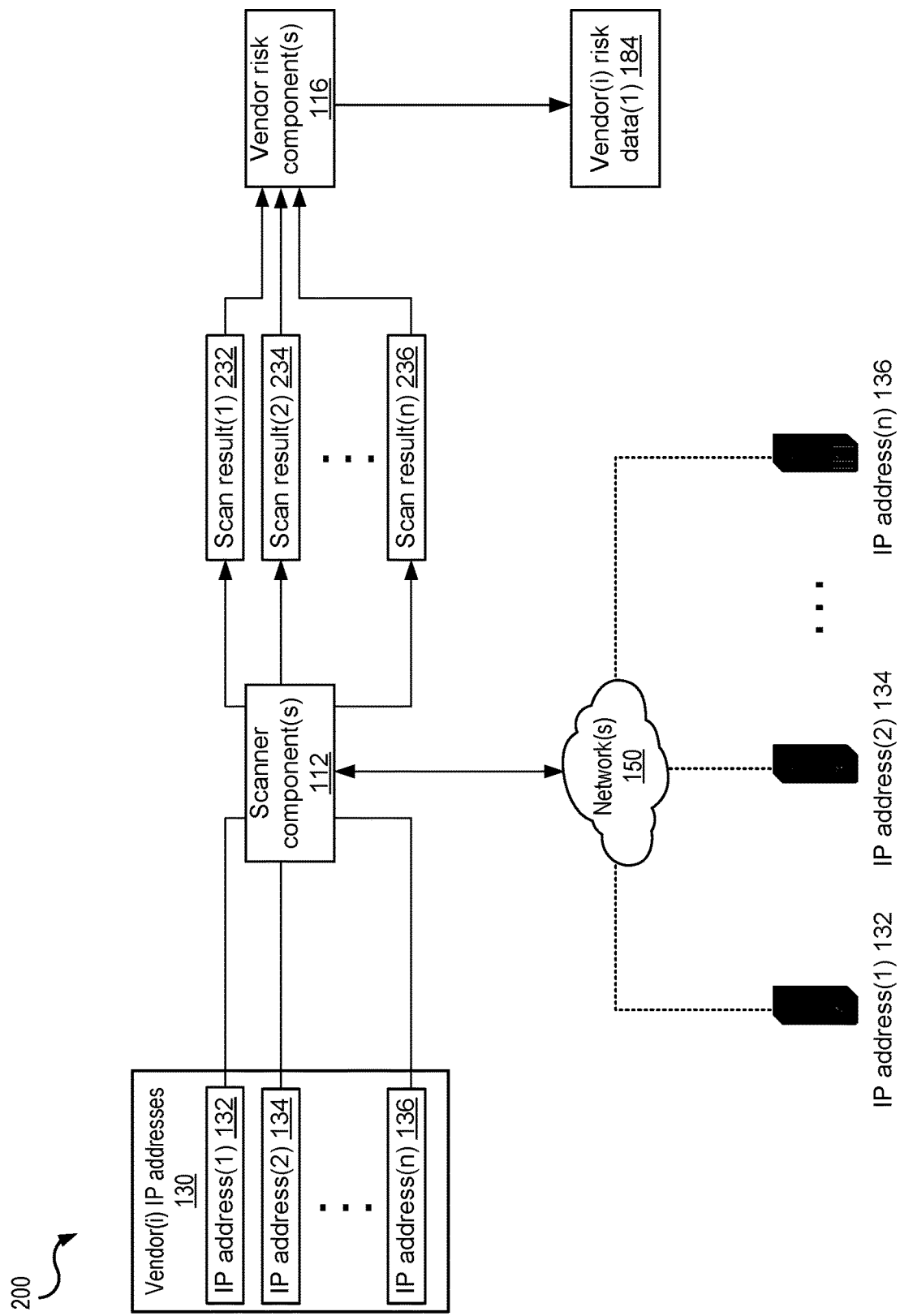
FIG. 2 is a block diagram illustrating an example system that obtains internet telemetry data to identify security exposure(s) as part of a vendor risk assessment process, in accordance with some embodiments.

Referring to FIG. 2, a block diagram 200 illustrates an example system that obtains internet telemetry data to identify security exposure(s) as part of a vendor risk assessment process, in accordance with some embodiments. FIG. 2 illustrates that, by using the scanner component(s) 112 as an outbound internet scanner targeted at a particular vendor, the system of the present disclosure provides the ability to collect a broad range of details on public exposure which can inform a security assessment of the particular vendor.

FIG. 2 illustrates that one aspect of the present disclosure involves performing a broad scan of the addressable internet space of a vendor to find details of exposure of different services, applications, and protocols. When possible, such scan results may be "fingerprinted" to arrive at a higher resolution on the details of exposure. To illustrate, such fingerprinting may involve identifying specific application versions, which in turn can reflect such details as vulnerability to particular exploits that may have been addressed by subsequent patches.

FIG. 2 illustrates that the scanner component(s) 112 may perform outbound internet scans for each of the individual IP addresses 132-136 associated with the vendor to obtain individual scan results. The individual scan results may include a broad range of details on public exposure which can inform a security assessment of the particular vendor. It should be noted that all data collected by the scanner component(s) 112 is inherently public and is not collected through any credentialed or invasive measures.

Some of these exposures can be considered relatively benign (e.g., HTTP, HTTPS, SSH, etc.), but some exposures can be regarded as indicators of high risk. One example is expired certificates, which can be extracted from public DNS records. Another example is exposed SMB, which has been used for significant exploits. Another example is exposed RDP, which does serve a functional purpose for an organization, but nonetheless elevates the riskiness of the organization. Another example is exposed infrastructure application protocols, which should not be exposed publicly. Examples of such infrastructure application protocols include: NTP; ADB; and BGP. Another example of a higher risk detail is exposed instances of unencrypted services, such as FTP and telnet. Another example is utilization of operating systems, applications, or services that have officially reached their end-of-life and are no longer supported or patched by the original producers.

FIG. 2 illustrates that the scanner component(s) 112 may be configured to perform, for the first IP address 132 associated with the vendor, an outbound internet scan via the network(s) 150 to obtain internet telemetry data for the first IP address 132. The scanner component(s) 112 may be configured to utilize the internet telemetry data to determine a first scan result 232 based at least in part on one or more security exposures associated with the first IP address 132. As an illustrative, non-limiting example, the first scan result 232 may include information regarding: relatively benign exposures (e.g., HTTP, HTTPS, SSH, etc.); expired certificates; exposed SMB; exposed RDP; exposed infrastructure application protocols (e.g., NTP, ADB, BGP, etc.); exposed instances of unencrypted services (e.g., ftp, telnet, etc.); and/or utilization of operating systems, applications, or services that have officially reached their end-of-life and are no longer supported or patched by the original producers.

FIG. 2 illustrates that the scanner component(s) 112 may be configured to perform, for the second IP address 134 associated with the vendor, an outbound internet scan via the network(s) 150 to obtain internet telemetry data for the second IP address 134. The scanner component(s) 112 may be configured to utilize the internet telemetry data to determine a second scan result 234 based at least in part on one or more security exposures associated with the second IP address 134. As an illustrative, non-limiting example, the second scan result 234 may include information regarding: relatively benign exposures (e.g., HTTP, HTTPS, SSH, etc.); expired certificates; exposed SMB; exposed RDP; exposed infrastructure application protocols (e.g., NTP, ADB, BGP, etc.); exposed instances of unencrypted services (e.g., ftp, telnet, etc.); and/or utilization of operating systems, applications, or services that have officially reached their end-of-life and are no longer supported or patched by the original producers.

FIG. 2 illustrates that the scanner component(s) 112 may be configured to perform, for each IP address in the set of IP addresses 130 through the nth IP address 136, an outbound internet scan via the network(s) 150 to obtain internet telemetry data for the respective IP addresses. With respect to the nth IP address 136, FIG. 2 illustrates that the scanner component(s) 112 may be configured to utilize the internet telemetry data obtained for the nth IP address 136 to determine an nth scan result 236 based at least in part on one or more security exposures associated with the nth IP address 136. As an illustrative, non-limiting example, the nth scan result 236 may include information regarding: relatively benign exposures (e.g., HTTP, HTTPS, SSH, etc.); expired certificates; exposed SMB; exposed RDP; exposed infrastructure application protocols (e.g., NTP, ADB, BGP, etc.); exposed instances of unencrypted services (e.g., ftp, telnet); and/or utilization of operating systems, applications, or services that have officially reached their end-of-life and are no longer supported or patched by the original producers.

FIG. 2 further illustrates that the scanner component(s) 112 may provide the scan results 232-236 to the vendor risk component(s) 116. The vendor risk component(s) 116 may aggregate the received scan results 232-236 to generate the first vendor risk data 184. The first vendor risk data 184 represents a first set of data utilized by the vendor risk component(s) 116 to determine the security risk level 190 (see FIG. 1) of the vendor. The security risk level 190 may represent an assessment of the overall riskiness of the vendor that is verifiable, independent, and objective.

Thus, FIG. 2 illustrates an example of a system that obtains internet telemetry data to identify security exposure(s) as part of a vendor risk assessment process. A particular vendor may be considered to be relatively high risk if various details are publicly exposed, which might reflect organizational practices that lead to scenarios of poor security. In general, the more risky elements that are exposed, the riskier a particular vendor may be considered. This knowledge represents one part of the consideration of whether or not to engage with a vendor and to entrust the vendor with privileged access at all.

Figure 3:
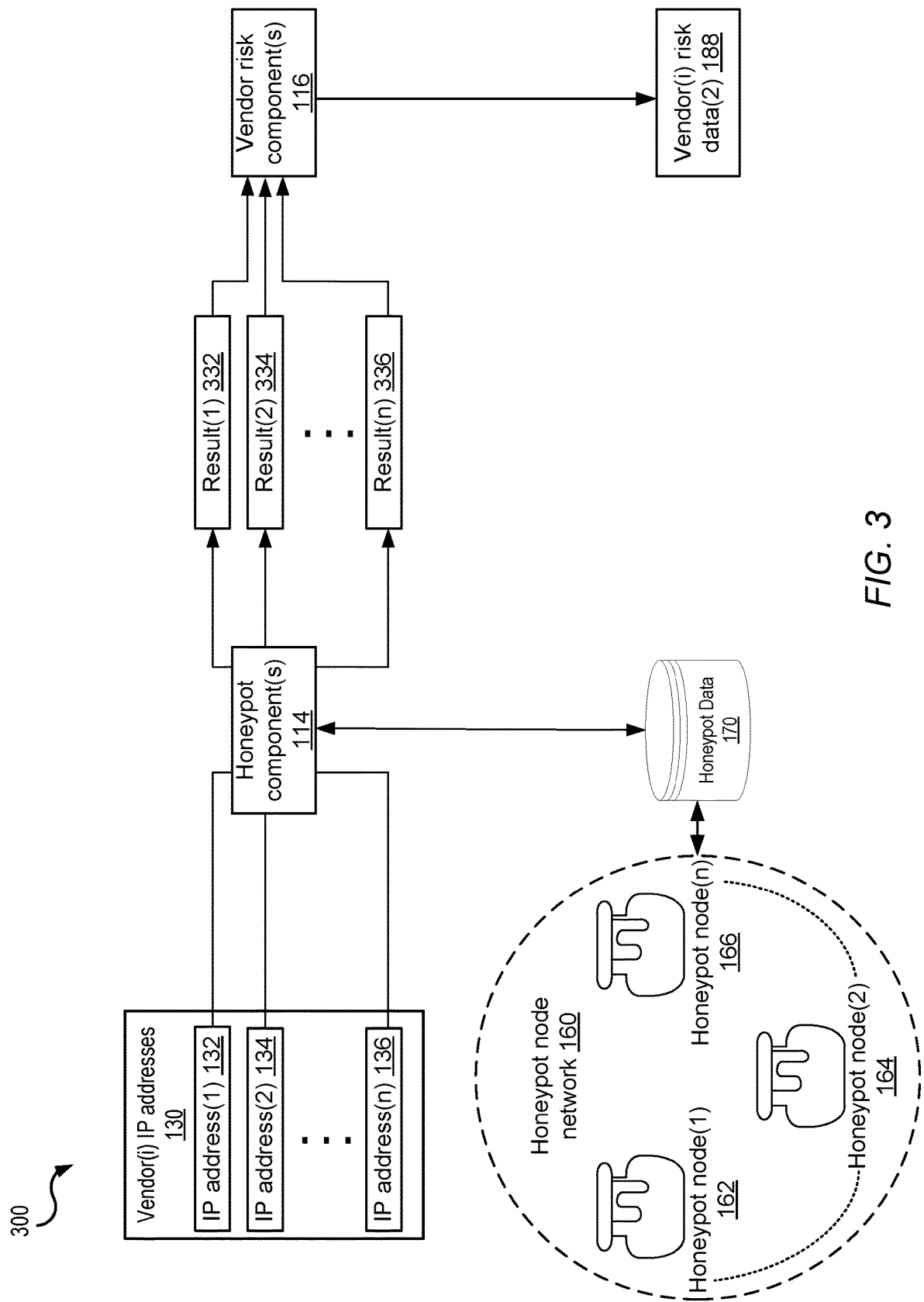
FIG. 3 is a block diagram illustrating an example system that determines whether honeypot connection(s) originate from a vendor as part of a vendor risk assessment process, in accordance with some embodiments.

Referring to FIG. 3, a block diagram 300 illustrates an example system that determines whether honeypot connection(s) originate from a vendor as part of a vendor risk assessment process, in accordance with some embodiments. In FIG. 3, the honeypot node network 160 may be configured to receive inbound connections indicative of malicious activity. Data associated with such inbound connections may be stored as the honeypot data 170, which may include IP address information associated with such inbound connections. FIG. 3 illustrates that, by using the honeypot component(s) 114 in combination with the honeypot data 170 from the honeypot node network 160, the system of the present disclosure provides the ability to determine if honeypot connection(s) are discovered as originating from a particular vendor which can inform a security assessment of the particular vendor.

FIG. 3 illustrates one aspect of the present disclosure may involve maintaining an active honeypot cloud network to monitor for inbound connections. Maintaining such an active honeypot network may allow for an examination of honeypot data for traffic originating from a vendor. As previously described herein, such honeypot data may complement an assessment of a vendor's riskiness as discovery of honeypot connection(s) originating from the vendor is indicative of some part of the vendor being compromised.

FIG. 3 illustrates that the honeypot component(s) 114 may compare each of the individual IP addresses 132-136 associated with the vendor to IP address information stored in the honeypot data 170 in order to obtain individual honeypot connection results. If such honeypot connection(s) are discovered as originating from the particular vendor, it may be assumed that some part of the particular vendor is compromised. Such honeypot connection(s) may be associated with a botnet, or there may be some sort of system misconfiguration, which reflects poorly on the reliability of that vendor's IT infrastructure. Such honeypot connection(s) may be considered especially concerning.

FIG. 3 illustrates that the honeypot component(s) 114 may be configured to access the honeypot data 170 to determine whether one or more honeypot connections originate from the first IP address 132 associated with the vendor. The honeypot component(s) 114 may generate a first honeypot connection result 332 for the first IP address 132, with the first honeypot connection result 332 indicating whether or not the honeypot data 170 identifies honeypot connection(s) as originating from the first IP address 132.

FIG. 3 illustrates that the honeypot component(s) 114 may be configured to access the honeypot data 170 to determine whether one or more honeypot connections originate from the second IP address 134 associated with the vendor. The honeypot component(s) 114 may generate a second honeypot connection result 334 for the second IP address 134, with the second honeypot connection result 334 indicating whether or not the honeypot data 170 identifies honeypot connection(s) as originating from the second IP address 134.

FIG. 3 illustrates that the honeypot component(s) 114 may be configured to access the honeypot data 170 for each IP address in the set of IP addresses 130 through the nth IP address 136 in order to determine whether one or more honeypot connections originate from the respective IP addresses. With respect to the nth IP address 136, FIG. 3 illustrates that the honeypot component(s) 114 may generate an nth honeypot connection result 336 for the nth IP address 136, with the nth honeypot connection result 336 indicating whether or not the honeypot data 170 identifies honeypot connection(s) as originating from the nth IP address 136.

FIG. 3 further illustrates that the honeypot component(s) 114 may provide the honeypot connection results 332-336 to the vendor risk component(s) 116. The vendor risk component(s) 116 may aggregate the received honeypot connection results 332-336 to generate the second vendor risk data 188. The second vendor risk data 188 represents a second set of data utilized by the vendor risk component(s) 116 to determine the security risk level 190 (see FIG. 1) of the vendor. The security risk level 190 may represent an assessment of the overall riskiness of the vendor that is verifiable, independent, and objective.

Thus, FIG. 3 illustrates an example of a system that determines whether honeypot connection(s) originate from a vendor as part of a vendor risk assessment process. A particular vendor may be considered to be relatively high risk if honeypot connection(s) are discovered as originating from the particular vendor. If such honeypot connection(s) are discovered as originating from the particular vendor, it may be assumed that some part of the particular vendor is compromised. Such honeypot connection(s) may be associated with a botnet, for example, or there may be some sort of system misconfiguration, which reflects poorly on the reliability of that vendor's IT infrastructure. Such honeypot connection(s) may be considered especially concerning. This knowledge may complement the assessment of a vendor's riskiness based on relatively high risk details that are publicly exposed.

Figure 4:
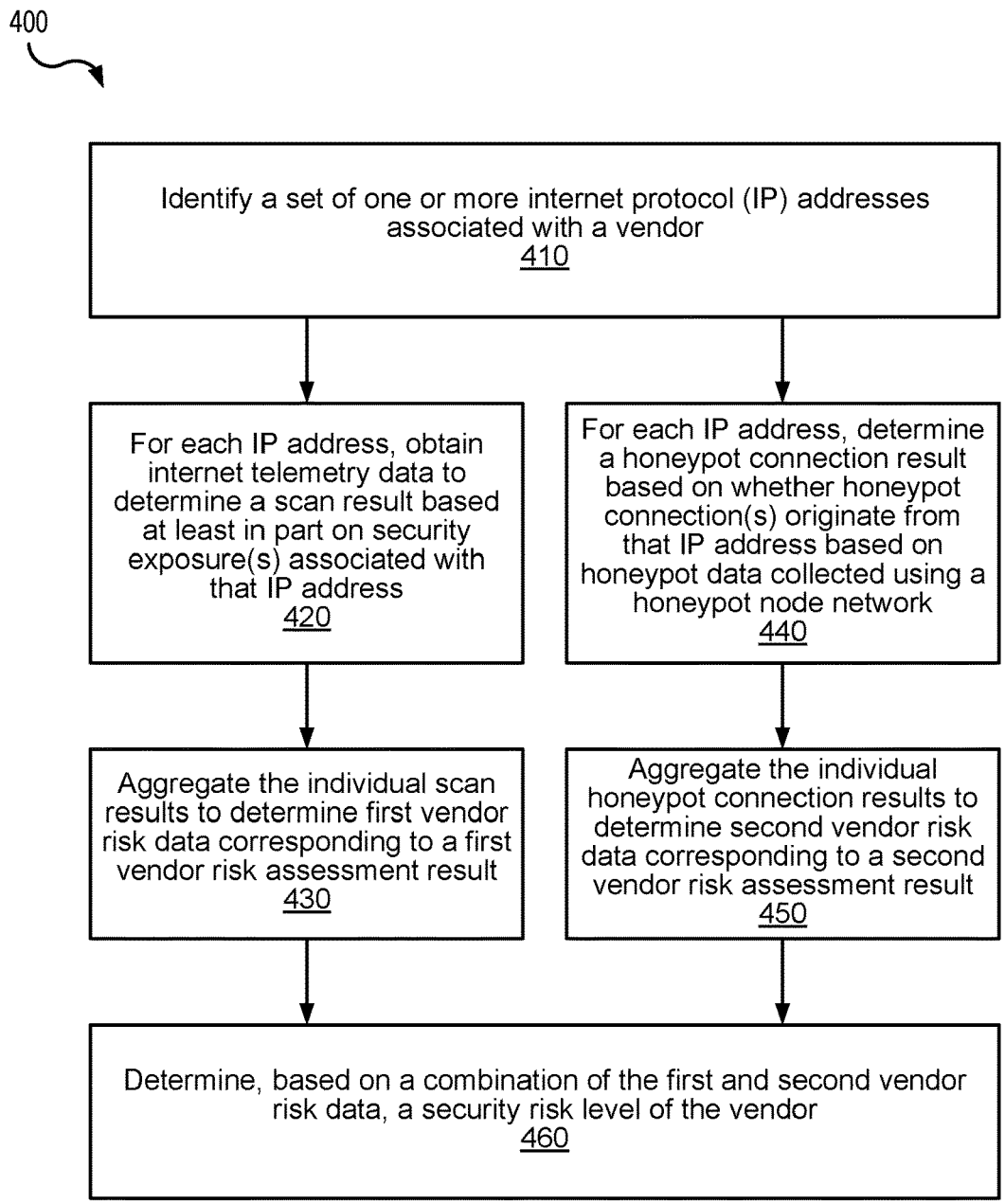
FIG. 4 is a flowchart that illustrates an example process of performing a vendor risk assessment, according to some embodiments.

FIG. 4 is a flowchart 400 that illustrates an example of a process of performing a vendor risk assessment, according to some embodiments. The example process of FIG. 4 provides the ability to collect information about an overall security posture of a vendor that is verifiable, independent, and objective. The overall security posture may inform a risk assessment of an outside vendor by an organization.

At operation 410, the process includes identifying a set of one or more IP addresses associated with a vendor. For example, referring to FIG. 1, the set of IP addresses 130 identified as being associated with one vendor (i.e., Vendor (i)) includes a first IP address 132 and a second IP address 134, up to an nth IP address 136.

At operation 420, the process includes, for each IP address associated with the vendor, obtaining internet telemetry data to determine a scan result based at least in part on security exposure(s) associated with a particular IP address. For example, referring to FIG. 2, the scanner component(s) 112 may perform outbound internet scans for each of the individual IP addresses 132-136 associated with the vendor to obtain the individual scan results 232-236. The individual scan results 232-236 may include a broad range of details on public exposure which can inform a security assessment of the particular vendor. It should be noted that all data collected by the scanner component(s) 112 is inherently public and is not collected through any credentialed or invasive measures.

At operation 430, the process includes aggregating the individual scan results for each IP address associated with the vendor to determine first vendor risk data corresponding to a first vendor risk assessment result. For example, referring to FIG. 2, the scanner component(s) 112 may provide the scan results 232-236 to the vendor risk component(s) 116. The vendor risk component(s) 116 may aggregate the received scan results 232-236 to generate the first vendor risk data 184. The first vendor risk data 184 may correspond to the first vendor risk assessment result 182 depicted in FIG. 1.

At operation 440, the process includes, for each IP address associated with the vendor, determining a honeypot connection result based on whether one or more honeypot connections originate from the particular IP address. The determination may be made based on honeypot data collected using a honeypot node network. For example, as previously described herein with respect to FIG. 3, the honeypot node network 160 may be configured to receive inbound connections indicative of malicious activity. Data associated with such inbound connections may be stored as the honeypot data 170, which may include IP address information associated with such inbound connections. As illustrated and further described herein with respect to FIG. 3, the honeypot component(s) 114 may compare each of the individual IP addresses 132-136 associated with the vendor to IP address information stored in the honeypot data 170 in order to obtain the individual honeypot connection results 332-336. The honeypot connection results 332-336 may indicate whether or not the honeypot data 170 identifies honeypot connection(s) as originating from the respective IP addresses 132-136.

At operation 450, the process includes aggregating the individual honeypot connection results for each IP address associated with the vendor to determine second vendor risk data corresponding to a second vendor risk assessment result. For example, referring to FIG. 3, the honeypot component(s) 114 may provide the honeypot connection results 332-336 to the vendor risk component(s) 116. The vendor risk component(s) 116 may aggregate the received honeypot connection results 332-336 to generate the second vendor risk data 188. The second vendor risk data 188 may correspond to the second vendor risk assessment result 186 depicted in FIG. 1.

At operation 460, the process includes determining, based on a combination of the first and second vendor risk data, a security risk level of the vendor. For example, referring to FIG. 1, the vendor risk component(s) 116 may determine, based on a combination of the first vendor risk data 184 and the second vendor risk data 188, the security risk level 190 of the vendor. The security risk level 190 may represent an assessment of the overall riskiness of the vendor that is verifiable, independent, and objective.

While FIG. 4 depicts an example of a process of vendor risk assessment for a single vendor, it will be appreciated that the process may be repeated for more than one vendor associated with an organization. As illustrated and described further herein with respect to FIG. 6, secondary exposure to risk through multiple vendors may reflect on an organization's risk posture.

Thus, FIG. 4 illustrates an example process of performing a vendor risk assessment. The example process depicted in FIG. 4 may provide the ability to assess the overall publicly-facing IT posture of one or more vendors associated with an organization. In contrast to conventional approaches to assessing vendor risk, the example process of FIG. 4 provides the ability to collect information about an overall security posture of the vendor(s) that is verifiable, independent, and objective. An organization may utilize this information when making decisions related to engagement with a particular vendor, alteration of a relationship with a particular vendor, or even termination of a relationship with a particular vendor based on security concerns.

Figure 5:
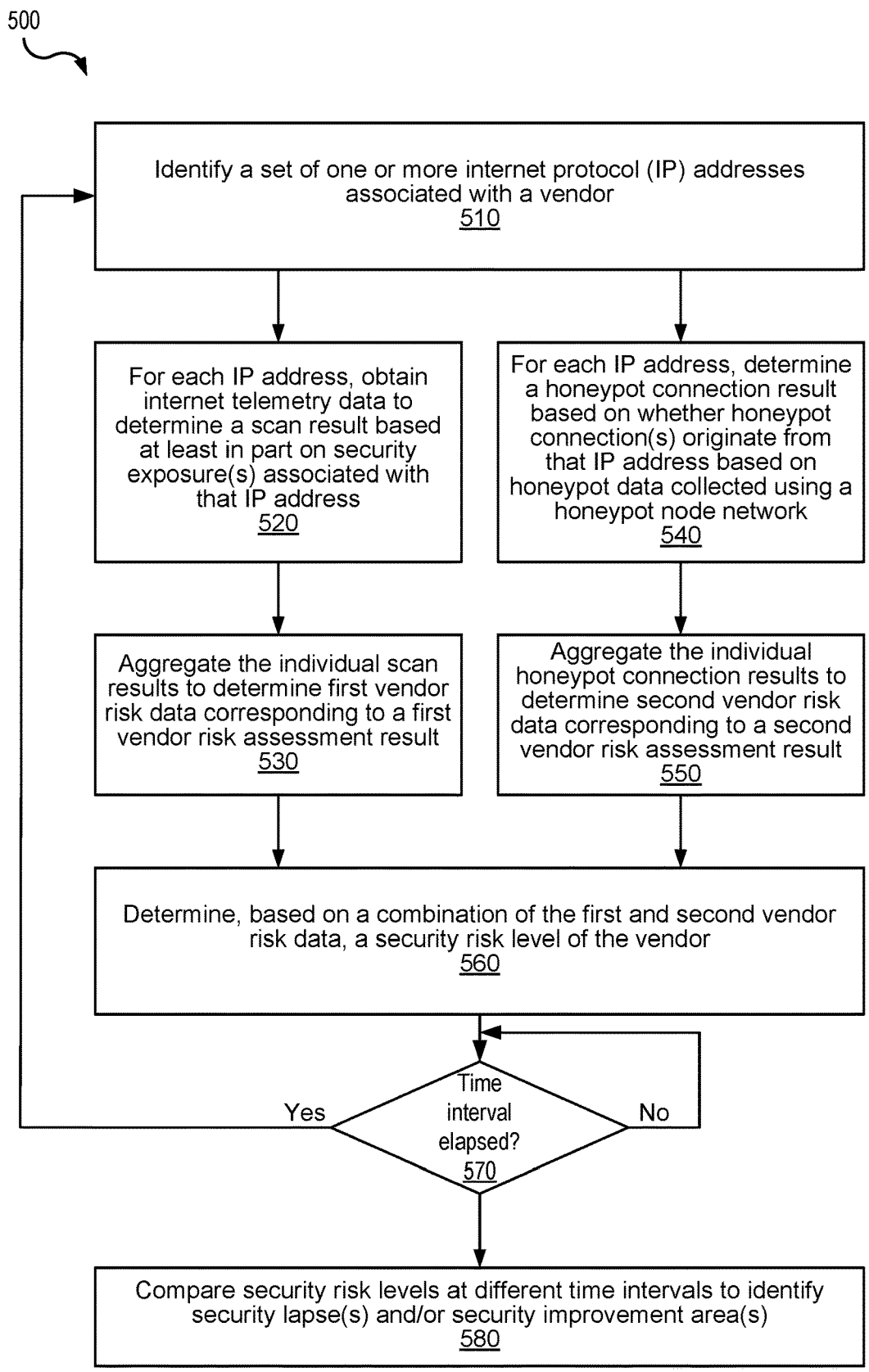
FIG. 5 is a flowchart that illustrates an example process of iteratively performing a vendor risk assessment, according to some embodiments.

FIG. 5 is a flowchart 500 that illustrates an example of a process of iteratively performing a vendor risk assessment, according to some embodiments. While FIG. 4 depicts an example of a single assessment of vendor risk, FIG. 5 illustrates that the approaches described herein may also be extended by repeating the same vendor assessment for one or more vendors at various time intervals. Repeating the assessment(s) for one or more vendors may provide the ability to determine if there have been any security lapses or areas for security improvement.

At operation 510, the process includes identifying a set of one or more IP addresses associated with a vendor. For example, referring to FIG. 1, the set of IP addresses 130 identified as being associated with one vendor (i.e., Vendor (i)) includes a first IP address 132 and a second IP address 134, up to an nth IP address 136.

At operation 520, the process includes, for each IP address associated with the vendor, obtaining internet telemetry data to determine a scan result based at least in part on security exposure(s) associated with a particular IP address. For example, referring to FIG. 2, the scanner component(s) 112 may perform outbound internet scans for each of the individual IP addresses 132-136 associated with the vendor to obtain the individual scan results 232-236. The individual scan results 232-236 may include a broad range of details on public exposure which can inform a security assessment of the particular vendor. It should be noted that all data collected by the scanner component(s) 112 is inherently public and is not collected through any credentialed or invasive measures.

At operation 530, the process includes aggregating the individual scan results for each IP address associated with the vendor to determine first vendor risk data corresponding to a first vendor risk assessment result. For example, referring to FIG. 2, the scanner component(s) 112 may provide the scan results 232-236 to the vendor risk component(s) 116. The vendor risk component(s) 116 may aggregate the received scan results 232-236 to generate the first vendor risk data 184. The first vendor risk data 184 may correspond to the first vendor risk assessment result 182 depicted in FIG. 1.

At operation 540, the process includes, for each IP address associated with the vendor, determining a honeypot connection result based on whether one or more honeypot connections originate from the particular IP address. The determination may be made based on honeypot data collected using a honeypot node network. For example, as previously described herein with respect to FIG. 3, the honeypot node network 160 may be configured to receive inbound connections indicative of malicious activity. Data associated with such inbound connections may be stored as the honeypot data 170, which may include IP address information associated with such inbound connections. As illustrated and further described herein with respect to FIG. 3, the honeypot component(s) 114 may compare each of the individual IP addresses 132-136 associated with the vendor to IP address information stored in the honeypot data 170 in order to obtain the individual honeypot connection results 332-336. The honeypot connection results 332-336 may indicate whether or not the honeypot data 170 identifies honeypot connection(s) as originating from the respective IP addresses 132-136.

At operation 550, the process includes aggregating the individual honeypot connection results for each IP address associated with the vendor to determine second vendor risk data corresponding to a second vendor risk assessment result. For example, referring to FIG. 3, the honeypot component(s) 114 may provide the honeypot connection results 332-336 to the vendor risk component(s) 116. The vendor risk component(s) 116 may aggregate the received honeypot connection results 332-336 to generate the second vendor risk data 188. The second vendor risk data 188 may correspond to the second vendor risk assessment result 186 depicted in FIG. 1.

At operation 560, the process includes determining, based on a combination of the first and second vendor risk data, a security risk level of the vendor. For example, referring to FIG. 1, the vendor risk component(s) 116 may determine, based on a combination of the first vendor risk data 184 and the second vendor risk data 188, the security risk level 190 of the vendor. The security risk level 190 may represent an assessment of the overall riskiness of the vendor that is verifiable, independent, and objective.

At operation 570, the process includes determining whether a time interval has elapsed. If the time interval has elapsed, the process repeats by returning to operation 510. If the time interval has not elapsed, the process includes waiting until the time interval has elapsed before returning to operation 510.

At operation 580, the process includes comparing security risk levels at different time intervals to identify one or more security lapses and/or security improvement areas. To illustrate, referring to FIG. 1, the security risk level 190 associated with the vendor may be determined to be one risk level at a first time. At a subsequent time after the time interval has elapsed, the security risk level 190 associated with the vendor may be determined to be a different vendor security risk level. When the security risk level 190 is different, one or more security lapses and/or security improvement areas may be identified. While not shown in the example of FIG. 5, in some cases, the process may include generating an alert when there is a change in the security risk level 190. In some embodiments, the alert may include information identifying security lapse(s) and/or security improvement area(s). An example process of generating an alert is illustrated and further described herein with respect to FIG. 7.

While FIG. 5 depicts an example of a process of vendor risk assessment for a single vendor at different time intervals, it will be appreciated that the process may be repeated for more than one vendor associated with an organization. As illustrated and described further herein with respect to FIG. 6, secondary exposure to risk through multiple vendors may reflect on an organization's risk posture.

Thus, FIG. 5 illustrates an example process of iteratively performing a vendor risk assessment. Repeating the vendor risk assessment(s) for one or more vendors at various time intervals may provide the ability to determine if there have been any security lapses or areas for security improvement.

Figure 6:
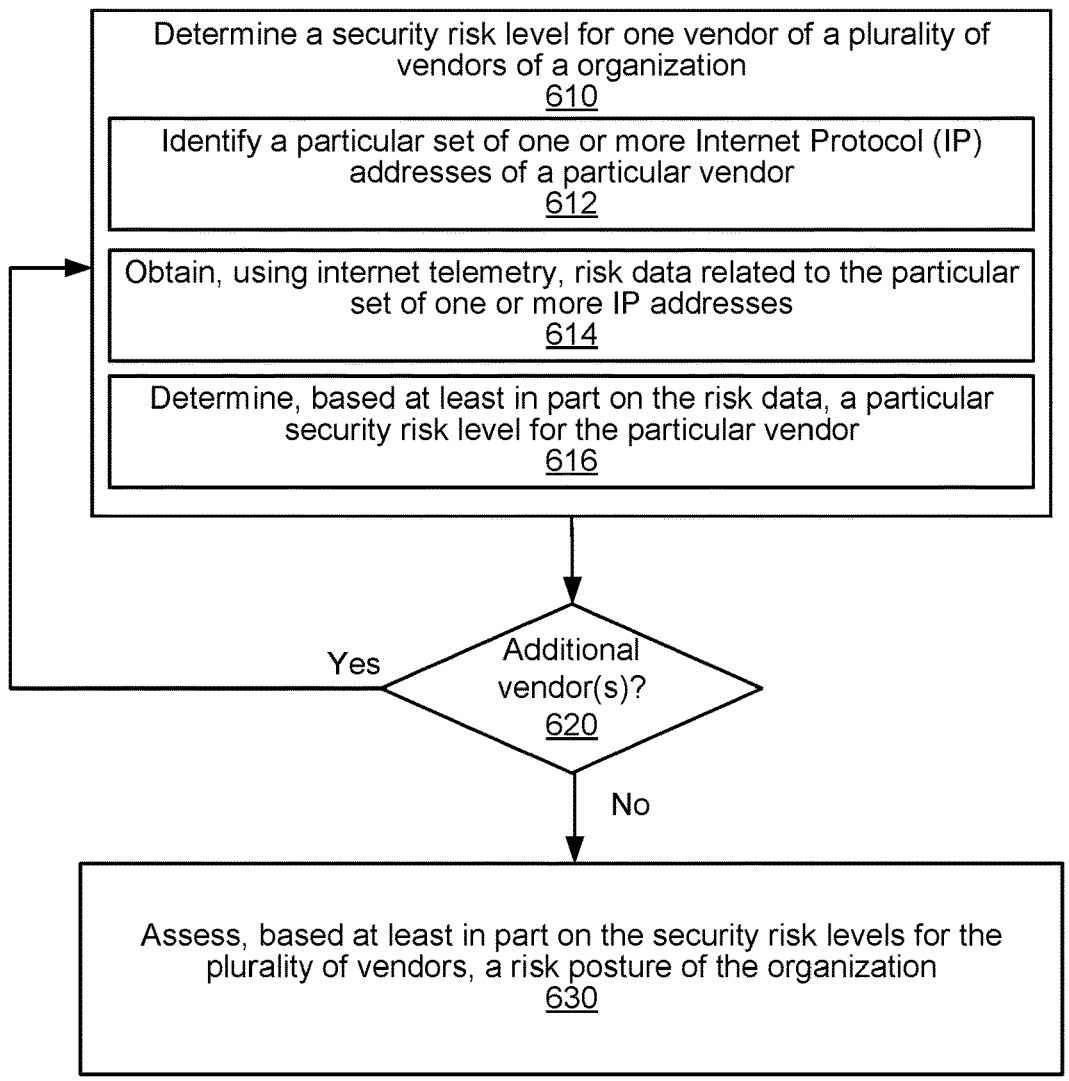
FIG. 6 is a flowchart that illustrates an example process of determining a vendor-based risk assessment posture of an organization, according to some embodiments.

FIG. 6 is a flowchart 600 that illustrates an example of a process of determining a vendor-based risk assessment posture of an organization, according to some embodiments. FIG. 6 illustrates that the approaches described herein may be extended to reflect on an organization's risk posture based on secondary exposure to risk through multiple vendors.

At operation 610, the process includes determining a security risk level for one vendor of a plurality of vendors of an organization. As illustrated in FIG. 6, this determination includes operations 612, 614, and 616.

At operation 612, the process includes identifying a particular set of one or more IP addresses of a particular vendor. For example, referring to FIG. 1, the set of IP addresses 130 identified as being associated with one vendor (i.e., Vendor (i)) includes a first IP address 132 and a second IP address 134, up to an nth IP address 136.

At operation 614, the process includes obtaining, using internet telemetry, risk data related to the particular set of IP address(es). As an example, referring to FIG. 2, the scanner component(s) 112 may perform outbound internet scans for each of the individual IP addresses 132-136 associated with the vendor to obtain the individual scan results 232-236. The individual scan results 232-236 may include a broad range of details on public exposure which can inform a security assessment of the particular vendor. FIG. 2 further illustrates that the vendor risk component(s) 116 may aggregate the scan results 232-236 to generate the first vendor risk data 184. Alternatively or additionally, as another example, referring to FIG. 3, the honeypot component(s) 114 may compare each of the individual IP addresses 132-136 associated with the vendor to IP address information stored in the honeypot data 170 in order to obtain the individual honeypot connection results 332-336. The honeypot connection results 332-336 may indicate whether or not the honeypot data 170 identifies honeypot connection(s) as originating from the respective IP addresses 132-136. FIG. 3 further illustrates that the vendor risk component(s) 116 may aggregate the honeypot connection results 332-336 to generate the second vendor risk data 188.

At operation 616, the process includes determining, based at least in part on the risk data, a particular security risk level for the particular vendor. For example, referring to FIG. 1, the vendor risk component(s) 116 may determine the security risk level 190 for a particular vendor (i.e., Vendor (i)). The security risk level 190 may be determined based on the first vendor risk data 184 (based on information obtained using the scanner component(s) 112), the second vendor risk data 188 (based on information obtained using the honeypot component(s) 114), or a combination thereof. The security risk level 190 may represent an assessment of the overall riskiness of the vendor that is verifiable, independent, and objective.

At operation 620, the process includes determining whether there are additional vendors associated with the organization. If yes, the process repeats for each individual vendor by returning to operation 610 to determine the respective security risk levels associated with the respective vendors. When there are no additional vendors to be evaluated, the process proceeds to operation 630.

At operation 630, the process includes assessing, based at least in part on the security risk levels for the plurality of vendors, a risk posture of the organization. To illustrate, if all of an organization's vendors are considered relatively high risk (based on a relatively high security risk level 190 for the combination of multiple vendors), then the organization is by extension considered relatively high risk. By contrast, if the same organization uses only relatively low risk vendors (based on a relatively low security risk level 190 for the combination of multiple vendors), then that organization is by extension considered relatively low risk.

Thus, FIG. 6 illustrates an example process of determining a vendor-based risk assessment posture of an organization. FIG. 6 illustrates that secondary exposure to risk through multiple vendors may reflect on an organization's risk posture, which is in effect an application of a centrality measure derived from graph theory. To illustrate, if all of an organization's vendors are considered relatively high risk, then the organization is by extension considered relatively high risk. By contrast, if the same organization uses only relatively low risk vendors, then that organization is by extension considered relatively low risk.

FIG. 7 is a flowchart 700 that illustrates a process of generating an alert and/or determining one or more remedial actions in response to determining a security risk level of a vendor (and/or assessing a risk posture of an organization based on security risk level(s) of its vendor(s)), according to some embodiments.

At operation 710, the process includes determining a security risk level of a vendor based on a combination of first and second vendor risk data. For example, referring to FIG. 1, the vendor risk component(s) 116 may determine, based on a combination of the first vendor risk data 184 and the second vendor risk data 188, the security risk level 190 of the vendor. The security risk level 190 may represent an assessment of the overall riskiness of the vendor that is verifiable, independent, and objective.

At operation 720, the process includes generating an alert associated with the security risk level of the vendor. In some non-limiting examples, the alert may be presented to a user via a graphical user interface (GUI) on an electronic display of a computing device. In some embodiments, generation of the alert may cause the computing device to present, via the GUI on the electronic display, an indication of the security risk level of the vendor. For example, referring to FIG. 1, the GUI component(s) 118 may be configured to generate an alert associated with the security risk level 190 of a particular vendor (i.e., Vendor (i)).

At operation 730, the process includes determining one or more remedial actions to mitigate one or more security risks associated with the vendor. For example, the computing device (e.g., computing resource(s) 110 in FIG. 1) may determine remedial action(s) that would mitigate a security vulnerability. In some non-limiting examples, generation of the alert may cause the computing device to present, via a GUI on the electronic display, the remedial action(s). For example, referring to FIG. 1, the GUI component(s) 118 may be configured to generate an alert that identifies one or more remedial actions (not shown in FIG. 1).

FIG. 8 is a block diagram illustrating an example computer system 800 that is used to implement one or more portions of a system that performs a vendor risk assessment, according to some embodiments. For example, the computer system 800 may be a server that implements one or more components of the computing resource(s) 110 of FIG. 1.

Computer system 800 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 800 includes one or more processors 810, which may include multiple cores coupled to a system memory 820 via an input/output (I/O) interface 830. Computer system 800 further includes a network interface 840 coupled to I/O interface 830. In some embodiments, computer system 800 may be a uniprocessor system including one processor 810, or a multiprocessor system including several processors 810a-n, as shown. The processors 810 may be any suitable processors capable of executing instructions. For example, in various embodiments, processors 810 may implement one of a number of instruction set architectures (ISAs), such as the x86, PowerPC, SPARC, or MIPS ISA.

As shown, the computer system 800 may also include one or more network communication devices (e.g., network interface 840) for communicating with other systems and/or components over a communications network. For example, an instance of an application executing on computer system 800 may use network interface 840 to communicate with another server application executing on another computer system, as described herein.

As shown, computer system 800 may use its network interface 840 to communicate with one or more other devices 860, such as persistent storage devices and/or one or more I/O devices. In some embodiments, some of these other devices may be implemented locally on the computer system 800, accessible via the I/O interface 830. In various embodiments, persistent storage devices may include disk drives, tape drives, solid state memory, other mass storage devices, or any other persistent storage device. The computer system 800 may store instructions and/or data in persistent storage devices, and retrieve the stored instruction and/or data as needed.

As shown, the computer system 800 may include one or more system memories 820 that store instructions and data accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 820 may be used to store code 825 or executable instructions to implement the methods and techniques described herein. For example, the executable instructions may include instructions to implement the scanner component(s) 112, the honeypot component(s) 114, and the vendor risk component(s) 116, as discussed. In some embodiments, while not shown in FIG. 8, the executable instructions may include instructions to implement the GUI component(s) 118, as discussed. The system memory 820 may also be used to store data 826 needed or produced by the executable instructions. For example, the in-memory data 826 may include portions of the vendor IP addresses 130, the first vendor risk data 184, and the second vendor risk data 188, as discussed.

In some embodiments, some of the code 825 or executable instructions may be persistently stored on the computer system 800 and may have been loaded from external storage media. The persistent storage of the computer system 800 and the external media are examples of non-transitory computer-readable storage media, which may be used to store program instructions to be executed by the computer system 800. A non-transitory computer-readable storage medium may provide the capability to store information in a form readable by a machine (e.g., computer system 800). Non-transitory computer-readable media may include storage media such as magnetic or optical media, disk or DVD/CD-ROM devices, archival tapes, network-attached storage systems, or other computer systems.

In some embodiments, the I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

In some embodiments, the network interface 840 may allow data to be exchanged between computer system 800 and other devices attached to a network. The network interface 840 may also allow communication between computer system 800 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). In some embodiments, the network interface 840 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement a vendor risk assessment system, wherein the memory stores program instructions executable on the one or more hardware processors to:
identify a set of one or more internet protocol (IP) addresses associated with a vendor network of a vendor that has a privileged access to private network;
for each IP address associated with the vendor:
perform a scan of a particular IP address to obtain scan results, wherein the scan is performed without use of credentials or invasive measures to the vendor network, and the scan results include internet telemetry data that indicate one or more security vulnerabilities associated with a particular IP address, including one or more of:
(a) an expired certificate,
(b) exposed server message block (SMB), or
(c) an exposed remote desktop protocol (RDP); and
determine, based on honeypot data collected using a honeypot node network, a honeypot connection result based on whether one or more honeypot connections originate from the particular IP address;

aggregate the individual scan results for each IP address associated with the vendor to determine first vendor risk data corresponding to a first vendor risk assessment result, wherein the first vendor risk data includes one or more security vulnerabilities of the vendor network detected based on the scan results;
aggregate the individual honeypot connection results for each IP address associated with the vendor to determine second vendor risk data corresponding to a second vendor risk assessment result, wherein the second vendor risk data includes a determination of whether the vendor network is compromised based on the honeypot connection results;
determine, based on a combination of the first and second vendor risk data, a security risk level of the vendor; and
automatically initiate one or more remedial actions based on the combination of the first and second vendor risk data and the security risk level of the vendor, including to automatically terminate a privileged access of the vendor.

2. The system of claim 1, wherein the scan is performed by a scanner configured to detect different types of security vulnerabilities including one or more of:
an exposed infrastructure application protocol,
an exposed instance of an unencrypted service,
an operating system that is no longer supported or patched by an operating system producer,
an application that is no longer supported or patched by an application producer, or
a service that is no longer supported or patched by a service producer.

3. The system of claim 2, wherein the exposed infrastructure application protocol includes a network time protocol (NTP), an android debug bridge (ADB), or a border gateway protocol (BGP).

4. The system of claim 2, wherein the unencrypted service includes a file transfer protocol (FTP) service or a telnet service.

5. The system of claim 1, wherein the set of one or more IP addresses associated with the vendor are identified by open source searching of domain details through domain name service (DNS) records or by examining internet registrar records.

6. The system of claim 1, wherein the set of one or more IP addresses associated with the vendor are identified based on information supplied by the vendor.

7. The system of claim 1, wherein the one or more security vulnerabilities associated with the particular IP address include a particular application, and wherein the one or more hardware processors are configured to identify a particular version of the particular application.

8. The system of claim 1, wherein program instructions are executable on the one or more hardware processors to generate an alert associated with the security risk level of the vendor.

9. The system of claim 1, wherein program instructions are executable on the one or more hardware processors to repeatedly assess the security risk level of the vendor over time based on new scans of the IP addresses of the vendor network and newly collected honeypot data.

10. A method comprising:
executing program instructions on one or more hardware processors, a vendor risk assessment, wherein the execution comprises:

identifying a set of one or more internet protocol (IP) addresses associated with a vendor network of a vendor that has a privileged access to private network;

for each IP address associated with the vendor:
performing a scan of a particular IP address to obtain scan results, wherein the scan is performed without use of credentials or invasive measures to the vendor network, and the scan results include internet telemetry data that indicate one or more security vulnerabilities associated with a particular IP address, including one or more of:
(a) an expired certificate,
(b) exposed server message block (SMB), or
(c) an exposed remote desktop protocol (RDP); and
determining, based on honeypot data collected using a honeypot node network, a honeypot connection result based on whether one or more honeypot connections originate from the particular IP address;

aggregating the individual scan results for each IP address associated with the vendor to determine first vendor risk data corresponding to a first vendor risk assessment result, wherein the first vendor risk data includes one or more security vulnerabilities of the vendor network detected based on the scan results;

aggregating the individual honeypot connection results for each IP address associated with the vendor to determine second vendor risk data corresponding to a second vendor risk assessment result, wherein the second vendor risk data includes a determination of whether the vendor network is compromised based on the honeypot connection results;

determining, based on a combination of the first and second vendor risk data, a security risk level of the vendor; and automatically initiating one or more remedial actions based on the combination of the first and second vendor risk data and the security risk level of the vendor, including to automatically terminate a privileged access of the vendor.

11. The method of claim 10, wherein the execution further comprises:
upon determining that a time interval has elapsed:
for each IP address associated with the vendor:
performing another scan of a particular IP address to obtain a subsequent scan result associated with the particular IP address; and
determining, based on honeypot data collected using the honeypot node network, a subsequent honeypot connection result based on whether one or more honeypot connections originate from the particular IP address;
aggregating the individual subsequent scan results for each IP address associated with the vendor to determine first subsequent vendor risk data corresponding to a subsequent first vendor risk assessment result;
aggregating the individual subsequent honeypot connection results for each IP address associated with the vendor to determine second subsequent vendor risk data corresponding to a subsequent second vendor risk assessment result;
determining, based on a combination of the first and second subsequent vendor risk data, a subsequent security risk level of the vendor; and
comparing the security risk level to the subsequent security risk level to identify one or more security lapses, one or more security improvement areas, or a combination thereof.

12. The method of claim 11, further comprising generating an alert that includes information related to the one or more security lapses, information related to the one or more security improvement areas, or a combination thereof.

13. The method of claim 10, further comprising classifying the vendor in a high-risk vendor class based on the security risk level of the vendor.

14. One or more non-transitory computer-accessible storage media storing program instructions that, when executed on or across one or more processors, implement at least a portion of a vendor risk assessment system and cause the vendor risk assessment system to:
identify a set of one or more internet protocol (IP) addresses associated with a vendor network of a vendor that has a privileged access to private network;
for each IP address associated with the vendor:
perform a scan of a particular IP address to obtain scan results, wherein the scan is performed without use of credentials or invasive measures to the vendor network, and the scan results include internet telemetry data that indicate one or more security vulnerabilities associated with a particular IP address, including one or more of:
(a) an expired certificate,
(b) exposed server message block (SMB), or
(c) an exposed remote desktop protocol (RDP); and
determine, based on honeypot data collected using a honeypot node network, a honeypot connection result based on whether one or more honeypot connections originate from the particular IP address;
aggregate the individual scan results for each IP address associated with the vendor to determine first vendor risk data corresponding to a first vendor risk assessment result, wherein the first vendor risk data includes one or more security vulnerabilities of the vendor network detected based on the scan results;
aggregate the individual honeypot connection results for each IP address associated with the vendor to determine second vendor risk data corresponding to a second vendor risk assessment result, wherein the second vendor risk data includes a determination of whether the vendor network is compromised based on the honeypot connection results;
determine, based on a combination of the first and second vendor risk data, a security risk level of the vendor; and
automatically initiate one or more remedial actions based on the combination of the first and second vendor risk data and the security risk level of the vendor, including to automatically terminate a privileged access of the vendor.

15. The one or more non-transitory computer-accessible storage media of claim 14, wherein the program instructions when executed on or across the one or more processors cause the vendor risk assessment system to generate a graphical user interface that identifies the security risk level of the vendor.

16. The one or more non-transitory computer-accessible storage media of claim 15, wherein the graphical user interface further identifies the first vendor risk assessment result and the second vendor risk assessment result.

17. The one or more non-transitory computer-accessible storage media of claim 16, wherein the first vendor risk assessment result includes at least a portion of the first vendor risk data.

18. The one or more non-transitory computer-accessible storage media of claim 16, wherein the second vendor risk assessment result includes at least a portion of the second vendor risk data.

19. The one or more non-transitory computer-accessible storage media of claim 14, wherein the program instructions when executed on or across the one or more processors cause the vendor risk assessment system to generate a graphical user interface that identifies the security risk level of the vendor.

20. The one or more non-transitory computer-accessible storage media of claim 19, wherein the security risk level classifies the vendor in a high-risk vendor class responsive to the honeypot connection result being indicative of at least one honeypot connection originating from at least one IP address of the set of one or more IP addresses associated with the vendor.

\* \* \* \* \*